US005799324A

United States Patent [19]
McNutt et al.

[11] Patent Number: 5,799,324
[45] Date of Patent: Aug. 25, 1998

[54] SYSTEM AND METHOD FOR MANAGEMENT OF PERSISTENT DATA IN A LOG-STRUCTURED DISK ARRAY

[75] Inventors: Bruce McNutt, Gilroy; Jaishankar Moothedath Menon; Kevin Frank Smith, both of San Jose, all of Calif.

[73] Assignee: International Business Machines Corporation, Armonk, N.Y.

[21] Appl. No.: 644,295

[22] Filed: May 10, 1996

[51] Int. Cl.$^6$ .................................................. G06F 17/30
[52] U.S. Cl. .................. 707/206; 707/200; 707/204; 707/205; 360/48
[58] Field of Search ................................ 707/206, 204, 707/200, 205; 711/4, 161, 136, 162; 360/48

[56] References Cited

U.S. PATENT DOCUMENTS

| | | | |
|---|---|---|---|
| 4,914,656 | 4/1990 | Dumphy, Jr. et al. | 371/10.2 |
| 4,916,605 | 4/1990 | Beardsley et al. | 711/162 |
| 5,083,229 | 1/1992 | Frey, Jr. | 360/78.04 |
| 5,124,987 | 6/1992 | Milligan et al. | 395/182.05 |
| 5,247,638 | 9/1993 | O'Brien et al. | 395/888 |
| 5,276,867 | 1/1994 | Kenely | 707/204 |
| 5,398,142 | 3/1995 | Davy | 360/48 |
| 5,416,915 | 5/1995 | Mattson et al. | 711/114 |
| 5,418,921 | 5/1995 | Cortney et al. | 711/114 |
| 5,422,762 | 6/1995 | Jerbic | 360/48 |
| 5,438,674 | 8/1995 | Keele et al. | 711/4 |
| 5,442,752 | 8/1995 | Styczinski | 711/4 |
| 5,551,003 | 8/1996 | Mattson et al. | 711/136 |
| 5,564,037 | 10/1996 | Lam | 711/161 |
| 5,692,193 | 11/1997 | Jagannathan et al. | 395/676 |

FOREIGN PATENT DOCUMENTS

| | | | |
|---|---|---|---|
| 6-175787 | 6/1994 | Japan | G06F 3/06 |
| 6-214722 | 8/1994 | Japan | G06F 3/06 |
| 7-36634 | 2/1995 | Japan | G06F 3/06 |
| 7-44326 | 2/1995 | Japan | G06F 3/06 |
| 7-44331 | 2/1995 | Japan | G06F 3/06 |

OTHER PUBLICATIONS

Ascherfeld et al., "Data Set Affinity Matrix Program", IBM Technical Disclosure Bulletin, vol. 27, No. 10B, Mar. 1985, pp. 6142–6143.

Patterson et al., "A Case for Redundant Arrays of Inexpensive Disks (RAID)", Report No. UCB/CSD 87/391, Dec. 1987.

Rosenblum et al., "The Design and Implementation of a Log–Structured File System", ACM, vol. 10 No. 1, Feb. 1992, pp. 26–52.

Scheuermann et al., "Automatic Tuning of Data Placement and Load Balancing in Disk Arrays", Departement Informatik 1992, ETH Zurich.

Scheuermann et al., "Adaptive Load Balancing in Disk Arrays", 4th Int'l Conference, FODO '93, Chicago, Ill. Oct. 13–15, 1993.

O'Quin, J.T., et al., IBM TDB, Nov. 1986, pp. 2628–2629, "Virtual Memory Page Space Allocation".

Cohn, O., et al., IBM TDB, Feb. 1995, pp. 323–326, "Reducing Data Movement in Log Structured File System Garbage Collection".

Primary Examiner—Thomas G. Black
Assistant Examiner—Greta L. Robinson
Attorney, Agent, or Firm—Esther E. Klein

[57] ABSTRACT

A system and method are provided for managing persistent and non-persistent data in a log structured disk array. In a log structured array, data are first collected in a log stored in a buffer. When the buffer is full, the data are written to a disk drive. Persistent data are continually accessed over a long period of time such that, most disk activity is associated with persistent data. Preferably, the persistent data are stored in the part of the disk where access times are minimal (active region), such as in the middle cylinders of a disk. When writing data (including during garbage collection procedure) persistent data is written to the active region and non-persistent data is written to the other regions (inactive region). The persistence of the data is monitored. Persistent data is migrated to the active region and non-persistent is migrated to the inactive region.

18 Claims, 8 Drawing Sheets

USE BIT MAP FOR N CYCLES

SYSTEM AND METHOD FOR MANAGEMENT OF PERSISTENT DATA IN A LOG-STRUCTURED DISK ARRAY

FIELD OF THE INVENTION

This invention relates to data storage systems and more particularly relates to a system and method for managing persistent data in a log-structured disk array.

BACKGROUND OF THE INVENTION

Disk Drives

Data used by a computer system are typically stored on a non-volatile storage device for later retrieval. Data stored in a direct access storage device (DASD), such as a disk drive, can be accessed directly rather than by passing over all intervening storage areas. In a magnetic recording disk drive, digital information is magnetically stored on a surface of a disk platter in concentric circular patterns called tracks. A spindle motor rotates the disk. A head, mounted on an actuator arm, reads and writes data to the disk as the disk rotates with respect to the head. A servo system causes the actuator to position the head over a desired track. The head reads and writes the data in conjunction with read/write electronics. The head writes the data as digital information by selectively polarizing an area of the disk surface. The head reads the data by sensing the polarity of the disk.

Typically, the disk platters of a disk drive are stacked in a disk stack (also known as "disk pack") and are mounted on a single spindle. Information is usually stored on both surfaces of each disk. That is, each surface of a disk in the disk pack is usually exposed to at least one head for reading and writing information on the surface. The heads are mounted on actuator arms. The actuator arms move in tandem radially over the disk surfaces.

In a typical disk drive, each track is assigned a number called the track address. The tracks are further divided into sectors. Each sector is assigned a number called the sector address. The head reads a particular sector when the sector rotates under the head. In a disk stack, a cylinder is made up of all tracks having the same track address. To access a particular surface of a disk stack, each head is assigned a head number or address. Therefore, in a disk drive, data can be accessed using the cylinder, head and sector numbers.

Disk Arrays

A disk array is a collection of many disk drives managed as a unit. Array management software causes the member disks to appear as a single disk to the host. Disk arrays can more closely match the data rate and availability application program requirements than a single large capacity disk. Typically a disk array is part of a storage subsystem. A storage subsystem connects to a host through an adapter and includes an array controller. The controller typically uses a microprocessor. Some systems implement the controller in software executing within the host.

In "A Case for Redundant Arrays of Inexpensive Disks (RAID)," Report No. UCB/CSD 87/391, December 1987, Patterson et al. define five levels of RAID. A RAID level 0 disk array distributes data across all the disks in the array (disk striping) but does not store redundant information. A RAID level 1 disk array stores identical images of the user data on two or more member disks (disk mirroring). A RAID level 2 disk array protects data using a Hamming code, and additional disks store the Hamming code. A RAID level 3 array subdivides and distributes each sector of data across all the disks. A dedicated disk, called a parity disk, stores parity information for error correction. The parity information is used to reconstruct the data when one of the disk drives in the array fails. The parity information is the result of exclusive-ORing (XOR) the corresponding sector data stored across the disks (parity stripe). In a RAID level 4 array, whole data sectors are stored on each disk in the array. Parity is calculated based on a group of sectors of data on each disk. As in RAID level 3, a dedicated parity disk stores parity information. RAID Level 5 is similar to RAID 4 but has no dedicated parity disk; each drive of the array stores a portion of the parity information.

In RAID 4 and 5, the parity information is updated for a write operation from the logical combination (XOR function) of the old data, the new data and old parity. While RAID 5 provides many benefits for increasing concurrent accesses, there is a write penalty. When writing data to the array, a write penalty is incurred because a write requires four array access operations: read old data, read old parity, write new data, and write new parity. However, unlike the write operation, there is no penalty when reading data.

Caching

Increased processor speeds have increased I/O demands on storage devices. Data stored in a random access memory can be accessed much faster than data stored in a disk drive. A cache is a random access memory and is often included as part of a storage subsystem to increase I/O speed. Typically, a cache stores information that either has recently been requested from the disk or that needs to be written to the disk. For read operations of frequently accessed data, a cache reduces repeated references to the disk drive.

When using a very large cache, a significant fraction of read requests can be satisfied without referencing the disk drive. However, usually the amount of storage available in the cache is much less than the amount of storage on the disk drive. Therefore, the cache storage is allocated and managed using a management algorithm such as a least recently used (LRU) algorithm. The LRU algorithm determines the order in which cache memory is freed for reuse by keeping in cache memory the most frequently accessed data and writing to disk (erasing from cache) data which has not been recently accessed. The least recently used data are less likely to be accessed again. A "read miss" refers to when the requested data are not currently stored in the cache and must be read from the disk.

Data are considered "persistent" when continually read from a disk drive over a over a long period of time. Although caches are used to manage frequently accessed data, persistent data are not read frequently enough to be maintained in the cache. A method is needed to minimize the access times for persistent data being read from the disk.

Log Structured Arrays

The write operation performance is improved by managing an array of disk drives as a log structured array. A log structured array (LSA) is a disk array managed as a log structured file (LSF). In a LSF, a sequential data structure, called a log, stores data written to the disk array. The log is divided into segments. A segment is the unit into which data to be written to the disk are grouped. A segment may also relate to a parity group in the disk array (that is, it gets striped across the disk in the array).

The log is stored in an internal memory cache or buffer, such as a memory segment buffer, of a storage subsystem.

The log collects new and modified data in the memory segment buffer until the buffer is full. The data are then written to the array sequentially in a single write operation. To minimize seeks during the single write operation, data are written consecutively in contiguous physical disk addresses.

The RAID-5 write penalty can be avoided using a LSA. If the layout of the LSA segment allows an entire parity stripe to be written to the disk at the same time, the corresponding parity is computed based only on the data being written without needing a prior read operation to read old data and old parity. This results in a substantial improvement in performance for LSA writes.

Logical Devices

Data may be stored in fixed or variable length format. In IBM 3390 formatted DASDs, data are stored in variable length "Count, Key, and Data" (CKD) records. The count field provides the address of the data (cylinder, head, and record) and the length of the data field. The data field contains the actual data and can vary in length.

Application programs running on a host computer read and write data using logical devices independent of the physical location of the data on a storage device. The application program accesses data from the storage system using logical cylinder, logical head, and logical record addresses. The controller in a storage system translates the logical cylinder, head and record addresses to the physical cylinder, head, and sector addresses at which the data are stored. Typically, a directory stores the information required for the translation. The host computer is unaware of the manner in which the data are accessed from the physical storage device.

The typical unit of data management within the controller is a logical track. The combination of the logical cylinder and logical head addresses represents the logical track address. In a LSA, logical tracks are grouped together into segments. The LSA directory has an entry for each logical track. Since the location of a logical track in a LSA changes over time, the directory indicates the current location of each logical track.

Each LSA directory entry for a logical track has the logical track number, the disk drive number, the starting sector within the disk, and the length of the logical track in sectors. After receiving a request to read a logical track, the controller examines the LSA directory. Using the information from the LSA directory, the controller accesses the requested sectors from the disk drive.

Logical tracks of data to be written to the array of disk drives are accumulated in the memory segment buffer and then written in batch to the disk array. The memory segment buffer can accommodate corresponding segment data to be written to each device of a parity group. The part of the segment belonging to a specific device is called a segment-column. The segment-columns have a fixed size that is determined by the design of the LSA. For example, each segment-column may be one physical track, many physical tracks, or one physical cylinder in size. When the system updates a logical track, the logical track data are written into one of the N+1 data segment-columns in the memory segment buffer (N+1 being the number of disk drives in the array). In a RAID-5 configuration, each segment has N data segment-columns and one parity segment-column, and each data segment-column and the parity segment column are on separate disk drives. When the memory segment buffer cannot store any new logical tracks from the host, a parity segment-column is calculated. The N+1 segment-columns are written to an empty segment on the disk array. The LSA directory is updated to reflect the new physical storage locations of the logical tracks in the disk array.

Garbage Collection in a LSA

Typically many logical tracks are stored together in a segment. Holes form in segments when a portion of or all of a logical track is deleted or modified. When a logical track is modified, the logical track is written into the next available segment in the log and stored on the disk. Because the data for the logical track is no longer stored in its original location, a hole is created in the original segment. Garbage collection consolidates the data and removes holes. During garbage collection, the control unit selects a subset of segments in the disk array that have a significant fraction of holes. All logical tracks from each segment in the selected subset are read from the disk and stored in a memory segment buffer. The logical tracks are written back to the disk when the memory segment buffer is filled with other logical tracks from the host computer or from other segments selected for garbage collection. The segments on the disks that are freed are returned to an empty segment pool. In that way, the garbage collection process creates empty segments by redistributing the data.

Because the array control unit includes a multi-tasking processor with significant local memory, the array control unit performs garbage collection as a background process.

Seek Time and Read Activity

A storage device incurs an access time when accessing data because the area on which the desired data are stored must be mechanically positioned under the head. The disk drive access time has two components. The first component is the movement of the actuator (arm motion) needed for access to the specified track. Time for this operation is called "seek time". The second component is the rotational delay for the desired sector to rotate under the head. It is desirable to minimize seek time because seek time is one of the most important factors in measuring overall performance of a disk drive.

Factors influencing arm motion are the clustering of data in storage and the pattern of reads and writes. Different applications executing on a host generate different patterns of read and write operations depending, for example, on whether the data are referenced sequentially or randomly. The dominant factor influencing seek time is whether the data requested together are stored contiguously or are dispersed. If data are stored in contiguous locations such as consecutive locations on the same track, then sequentially reading or writing the data minimizes the seek time because the head does not move to a different physical track. In contrast, if the data are randomly distributed in storage, then the seek time increases because the head moves to different physical tracks. Frequently, database applications exhibit a pattern of random writes for updating data followed by queries generating sequential reads. It is disirable to reduce the seek time for accessing data in a storage system.

In U.S. Pat. No. 5,416,915, Mattson et al. teach a method for reducing arm motion in a disk array where logical cylinders are managed as individual log structured files. Tracks or segments of data and parity blocks are written into a directory managed buffer. Blocks having the same parity affinity and written to counterpart cylinders are written from the buffer to spare space reserved as part of each cylinder. Otherwise, blocks are updated in place in their disk array location. This method is advantageous when sequentially accessing data in contiguous disk locations.

In commonly assigned patent application Ser. No. 08/196,047, Mattson et al. disclose a method for managing a LSA using write age separation and read activity clustering to control arm motion. Read activity is a measurement that approximates the recent I/O rate of the data. To calculate read activity, a read activity indicator R and a timestamp of the most recent read miss are stored. Each time a logical track is read from the disk on a read miss, R is multiplied by an exponential decay factor (a read activity weighting factor) corresponding to the time between the timestamp and the time of the current read miss. When the time between read misses is large, R carries little weight. Finally, one (1) is added to R to count the current miss. In that way, more recent read misses are given a greater weight when writing a logical track to the disk. With high value for its R index, the logical track is placed in the middle cylinders of the disk (where it is more easily accessible).. Neither application Ser. No. 08/196,047 nor U.S. Pat. No. 5,416,915 addresses measurement and management of persistent data. Persistent data are repeatedly accessed from the disk over a long period of time. In application Ser. No. 08/196,047 now U.S. Pat. No. 5,551,003 the read activity measurement gives a heavier weight to the most recent read miss. Therefore, the read activity measurement does not efficiently manage data that has a long period of time between read misses (or clusters of read misses) relative to the exponential decay of the read activity weighting factor. Therefore, to improve performance, a method is needed to measure and manage persistent data.

Furthermore, in application Ser. No. 08/196,047 now U.S. Pat. No. 5,551,003, corrections to data placement, beyond logging and garbage collection, are accomplished by writing data present in the cache, which already have corresponding storage locations on the disk, to the middle cylinders of the disk. Although activity is concentrated at the middle cylinders of the disk, the method invalidates those storage locations on the disk that previously contained the data now present in the cache, and therefore creates holes. As a result, one aspect of performance, arm motion, is improved at the expense of another, garbage collection. Therefore, a self-contained method, independent of garbage collection, is needed to arrange data to reduce arm motion.

SUMMARY OF THE INVENTION

It is an object of this invention to provide a method for monitoring and managing persistent data to accomplish the stable placement of data in a log structured array.

It is also an object of this invention to provide a self-contained method of arranging data to reduce arm motion.

In view of the foregoing objects, the present invention manages data in a storage system which includes a processor, memory and at least one storage device. Each storage device has an active region and an inactive region where a plurality of data blocks are stored in each region. Each data block is determined to be either persistent or non-persistent. Periodically, at least one persistent data block is selected from the inactive region, and at least one non-persistent data block is selected from the active region. The selected persistent data blocks from the inactive region are periodically migrated to the active region and the selected non-persistent data blocks from the active region are periodically migrated to the inactive region.

In the preferred embodiment, segments of data blocks in the active region having non-persistent data blocks and segments in the inactive region having persistent data blocks are selected and data blocks from the selected segments are migrated to segments in more appropriate regions for the type of data. The persistence of each data block is determined and the data block is stored in the appropriate region on the disk corresponding to the persistence of the data block at any of the following: when writing new data, when garbage collecting or at special migration times. Preferably the migration of data blocks occurs during cycles. A cycle is determined either by counting a predetermined number of read misses or using a predetermined duration of time. Preferably, the persistence of data is determined by tracking the read activity for groups of data blocks over a plurality of cycles. A data block is considered persistent if it is part of a data block group where at least one record miss has occurred for at least one data block in the group for a threshold number of cycles out of a predetermined number of cycles.

DETAILED DESCRIPTION OF THE INVENTION

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention. The article of manufacture containing the computer programming code is used by either executing the code directly from a machine readable storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

Figure 1:
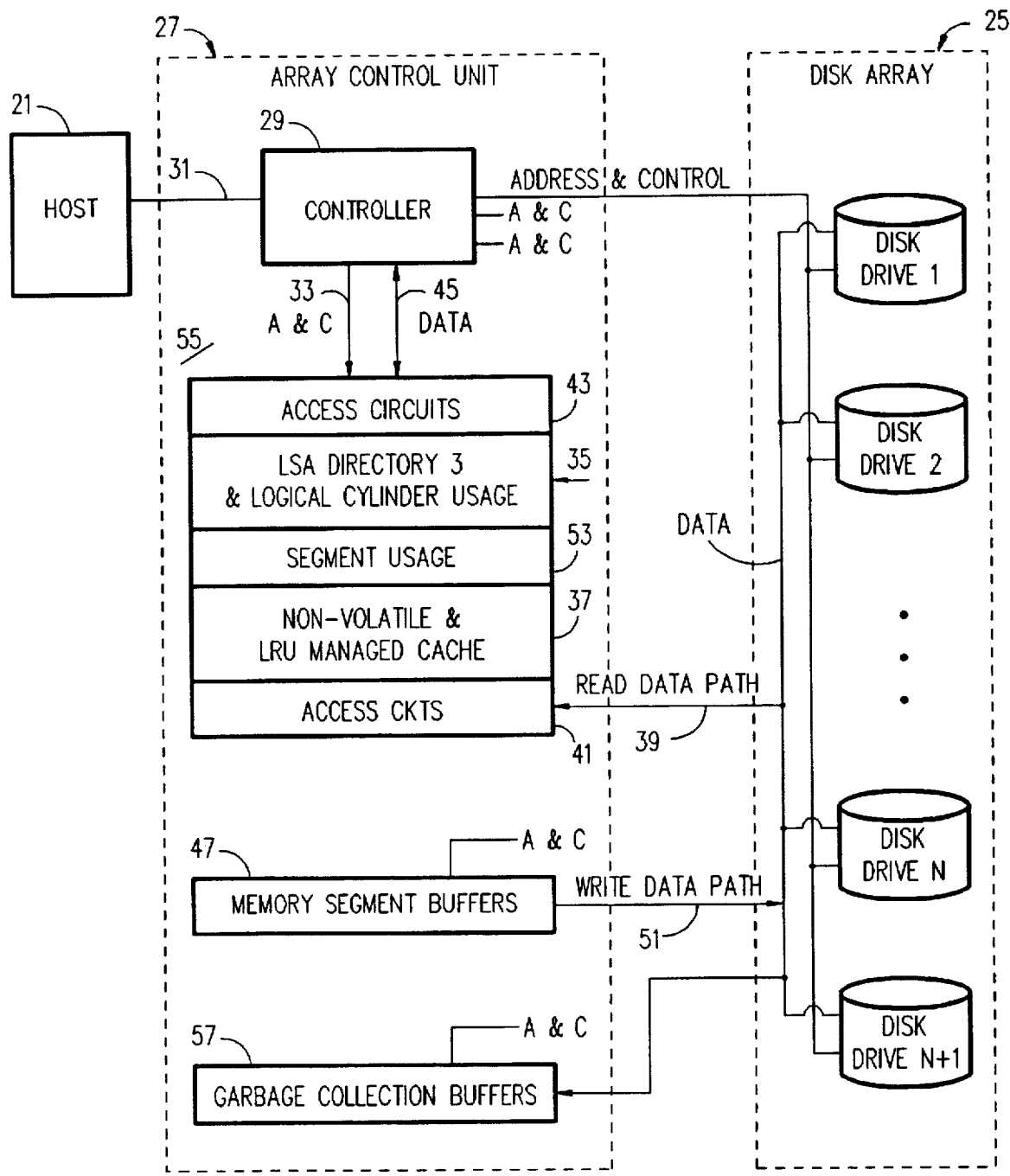
FIG. 1 is a block diagram of a storage subsystem including an array and a control unit according to the preferred embodiment of the present invention.

Referring to FIG. 1, a host processor (host) 21 is connected to an external storage system 23. The external storage system 23 comprises a disk array 25 and an array control unit 27 coupling the host 21 to the array 25. The disk array 25 has N+1 disk drives. The host 21 preferably comprises at least one processor to execute the system and application code, memory to hold system code, application code, and data, and a means responsive to read and write calls from executing applications for accessing information through the system code (otherwise termed operating system, such as IBM MVS and IBM AIX operating systems) not otherwise in memory from the external storage 23. The array control unit 27 has a controller 29 having a processor, memory 55, and code stored in memory executing in the processor. The memory 55 stores a LSA directory 35, a logical cylinder usage table 36, a segment usage table 53, and a non-volatile cache (cache) 37. The controller 29 connects to the disk array 25, memory 55, memory segment buffers 31, and garbage collection buffers 57.

One example of a host system is the IBM System/370 or 390 running the IBM MVS operating system. In U.S. Pat. No. 4,207,609, "Method and Means for Path Independent Device Reservation and Reconnection in a Multi-CPU and Shared Device Access System," issued Jun. 10, 1980, and the references cited therein, Luiz et al. describe an architecture for establishing an access path to data in which a host obtains variable or fixed length records from an attached disk storage subsystem. The host central processing unit (CPU) creates a dedicated virtual processor for accessing and transferring data over demand/response interfaces to attached subsystems using chains of special purpose I/O instructions called channel command words (CCWs). The CCWs are stored in a portion of CPU main memory in support of fast calls. When an application program executes a read or write command requiring access to external storage, such as disk storage, then the MVS operating system initiates such a reference with a START I/O command. The START I/O command causes the CPU to suspend its multi-processing state, transfer to the CCW chain, and re-establish its prior state after CCW chain completion.

In FIG. 1, the host 21 sends a CCW chain to the controller 29 over the path 31. The controller 29 interprets each of the CCWs and responsively applies counterpart control and address signals over path 33 to the LSA directory 35 to ascertain the location of data either in the LRU managed cache 37 or on disk array 25. Data are transferred between the host 21 and the array 25 in the read direction over a path including the read data path 39, access circuits 41, cache 37, access circuits 43, path 45, and controller 29. Data are transferred in the write direction over a path including the controller 29, access circuits 43, cache 37, access circuits 41, accumulating memory segment buffer 47, and write path 51.

The controller 29 comprises at least one microprocessor (not shown) with sufficient associated local memory (not shown) for storing software for interpreting the CCWs and managing the cache 37 and the disk array 25. The disk array 25 may be managed by controller 29 or any of the types of RAID arrays as previously (or subsequently) defined as are well known to those skilled in the art.

The memory segment buffers 47 are formed from a plurality of segment sized buffers. The cache 37 interacts with the memory segment buffers 47. The cache 37 holds both updated (modified from how the data is stored on the disk array), referred to as "dirty", logical tracks received from the host 21 and "clean", (unmodified from how the data is stored on the disk array) logical tracks read from disk array 25. The cache 37 is managed in the well-known LRU fashion (described previously). That is, the cache 37 contains clean tracks organized in one LRU list according to how recently there was a request and modified tracks organized in another LRU list. The controller 21 monitors the fraction of the cache occupied by modified tracks. When the fraction exceeds a threshold, some of the modified tracks are moved (logically) to one of the memory segment buffers 47. After filling a segment of the memory segment buffer 47 with logical tracks, the logical tracks in the segment are written into contiguous locations in the disk array 25. When cache memory is needed to hold new logical tracks read from the disk array 25, or new logical tracks received from the host 21, clean tracks from the LRU list are overwritten in cache 37.

As shown in the figures, the preferred embodiment of the present invention has a separate array control unit 27. However, in an alternative embodiment (not shown) the array control unit 27 is implemented in software executing on the host.

Figure 2:
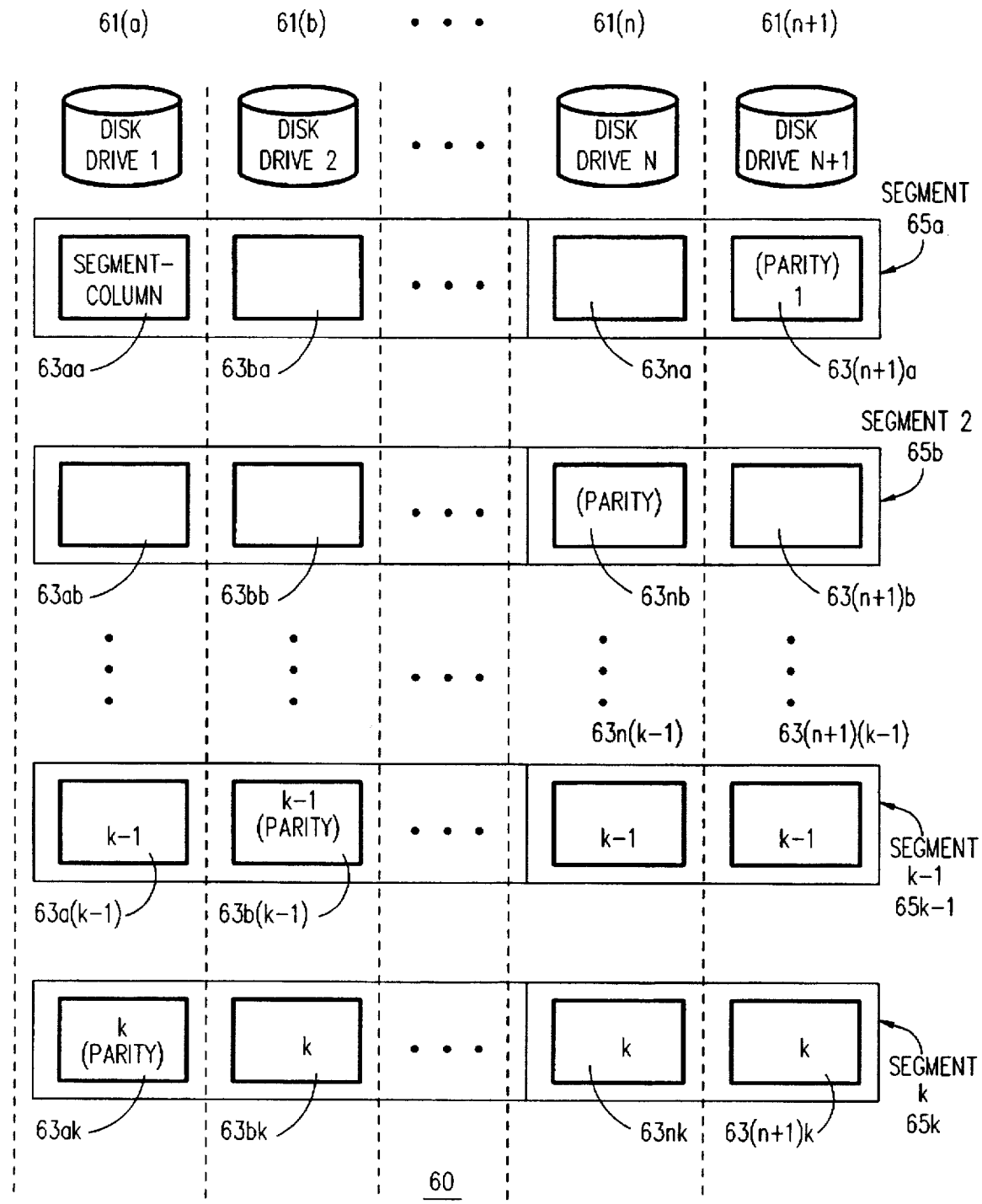
FIG. 2 is a diagram of a layout of data on a disk array.

Referring to FIG. 2, in the RAID-5 LSA configuration, a disk array 60 consists of disk drives $61(a)$–$61(n+1)$. There are N disk drives for storing data and one additional disk drive to allow parity to be stored on any of the N+1 disk drives $61(a)$–$61(n+1)$. Each disk drive $61(a)$–$61(n+1)$ has a plurality of segment-columns $63(a)(a)$–$63(n+1)(k)$. Each segment-column has a plurality of physical tracks (not shown). A segment-column can be larger, smaller or equal to a physical cylinder on a disk drive. A segment $65(a)$–$65(k)$ is made up of corresponding segment-columns $63(a)(a)$–$63(n+1)(k)$ from each of the N+1 disk drives $61(a)$–$61(n+1)$. Alternatively, the segment can be composed of segment-columns of differing addresses on each drive. Preferably, a disk array 60 of N+1disk drives $61(a)$–$61(n+1)$ has as many segments $65(a)$–$65(k)$ as there are physical cylinders $63(a)$ $(a)$–$63(n+1)(k)$ on any one of the disk drives $61(a)$–$61(n+1)$ in the array 60. One segment-column of a segment stores the parity of the other segment-columns of the segment. The segment is the smallest unit of disk storage allocation.

The storage system manages data in blocks. A block can be any unit of data organization used in a storage system as known to those skilled in the art. In the preferred embodiment of the present invention, a block is a logical track. In an alternative embodiment of the present invention, a block corresponds to a record having a fixed size.

Figure 3:
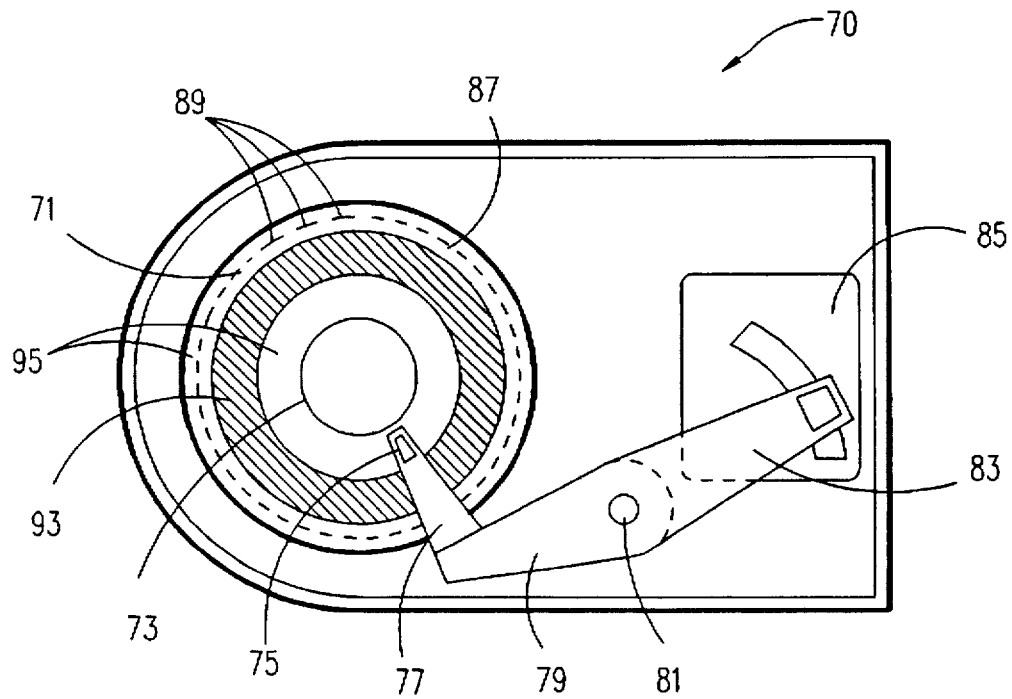
FIG. 3 is simplified top view of a magnetic disk drive showing the location of persistent data in the preferred embodiment of the present invention.
Figure 4:
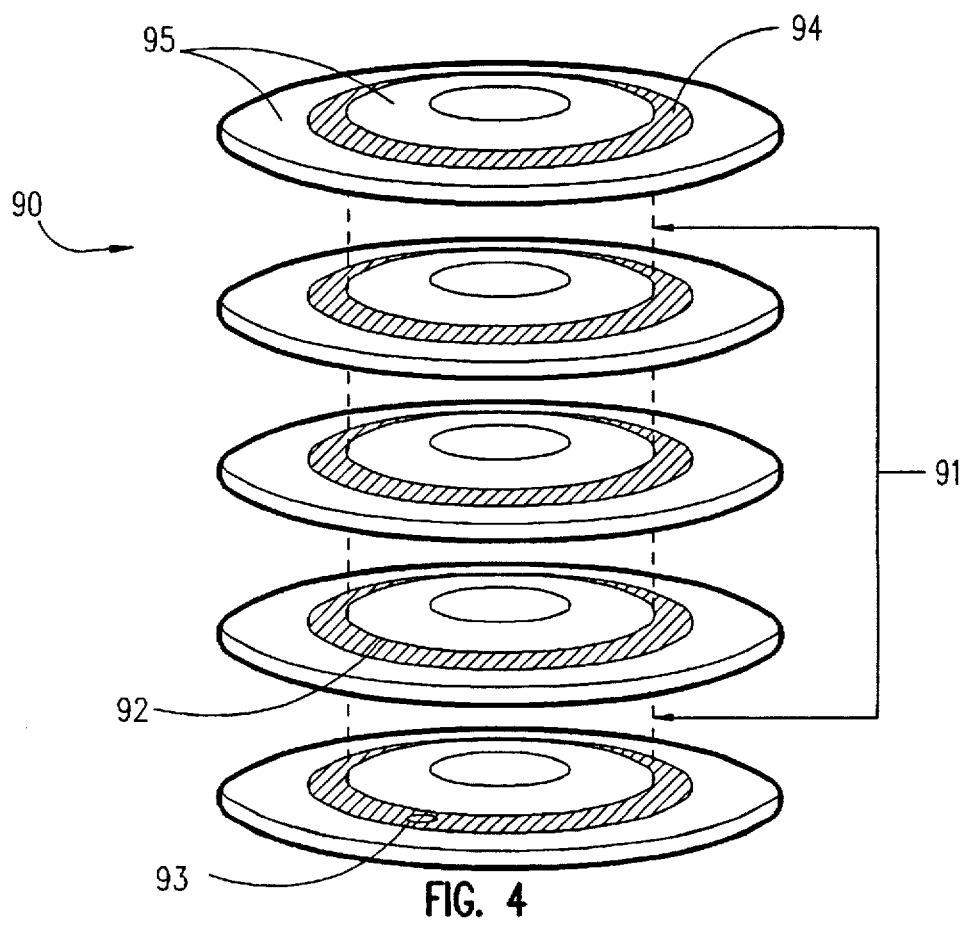
FIG. 4 is an exploded view of a disk stack showing cylinders, tracks, sectors, and the location of persistent data in the preferred embodiment of the present invention.

Referring to FIG. 3, disk drive 70 includes a stack of disks (as shown in FIG. 4) each having surfaces carrying magnetic material. Disks 71 are mounted for simultaneous rotation around a common axis by an integrated spindle and motor assembly 73. Data are written to and read from the disk surfaces by magnetic read/write heads 75 that move across the disk surfaces. Heads 75 are mounted on flexure springs 77 carried by arms 79 ganged together for simultaneous pivotal movement about a support spindle 81. One arm 79 includes an extension 83 driven in pivotal motion by a head drive motor 85.

Each magnetic surface of each disk 71 is formatted to include numerous concentric circular physical tracks 87, one of which is indicated by a sectored line. Each physical track includes numerous sectors 89. Blocks are written to and read from the sectors 89 by heads 75. Each block of data has a unique physical address within the disk drive 70. In response to control signal received from the controller, the heads 75 are positioned over the physical track 87 containing the desired data block and the reading or writing operation is performed as the target sectors spin under the head.

Referring to FIG. 4, a disk stack 90 has a plurality of physical cylinders 91, physical tracks 92, and sectors 93. The physical cylinder 91 is a set of physical tracks 92 having the same physical track address on the a disk drive but each physical track 92 has a different head number.

Monitoring Persistent Data

Persistent data are data which continues to be used over a long period of time. The preferred embodiment of the present invention focuses on read misses to determine persistence. In a LSA, large amounts of data are consolidated and written sequentially. The sequential writes are performed as a background process and do not ordinarily delay service of host requests. Delays to service of host requests are usually caused by read misses. Delays may also be caused by any reads needed for track format verification prior to handling a write request, which either does not occur at all or is extremely infrequent. Therefore, the present invention focuses on read misses to reduce access time.

One measure of persistent data is the number of periods or cycles having at least one read miss out of a predetermined number of cycles for each individual logical track (data block). If the number of cycles having at least one read miss for a logical track unit exceeds a predetermined threshold, then the logical track contains persistent data.

In the preferred embodiment, the persistence of each logical track is not measured. Logical tracks are grouped together for persistence measurement. Preferably, the grouping unit is a logical cylinder. In other words, logical tracks are grouped into logical cylinders, and each logical track of a logical cylinder is assumed to have substantially the same persistence. Since the measurement unit is a logical cylinder, the individual persistence characteristic of each logical track within the logical cylinder cannot be distinguished. Therefore all logical tracks within a logical cylinder have the same persistence, even if the logical tracks are stored in different segments in physically different locations on the disk.

More generally, in the preferred embodiment of the present invention, the measure of persistent data is the number of cycles having at least one read miss out of a predetermined number of cycles for a particular grouping of data blocks. Preferably, persistence is monitored for logical cylinders. Other groupings or data block units could also be used as the unit for determining persistence.

Placement of Persistent Data on the Disk

FIGS. 3 and 4 show the active region 94 (shaded area) and inactive regions 95 (unshaded) in a disk stack. According to the preferred embodiment of the present invention, the active region 94 consists of the middle cylinders of the disk and is for storing segments having persistent data. Non-persistent data are placed in inactive regions 95 on the cylinders at the disk extremities. Because the majority of disk activity is associated with persistent data, most accesses will occur in the active region 94. In an alternative embodiment of the present invention (not shown), the active region consists of the innermost cylinders of the disk and the inactive region consists of the outermost cylinders of the disk. In another alternative embodiment (not shown), the active region consists of the outermost cylinders of the disk and the inactive region consists of the innermost cylinders of the disk.

Preferably, a segment is a fixed amount of physical storage from matching physical areas on each disk, in which case, either an entire segment is in the middle cylinders of the disk or it is not.

Usage Data

Each period over which persistent data is measured is called a cycle. The controller maintains a clock by counting the number of "cycles" since going into operation. In the preferred embodiment of the present invention, each cycle consists of a fixed number C of read misses where C equals thirty thousand (30,000). In an alternative embodiment, a cycle consists of a fixed period of time, such as eight (8) hours. As will be appreciated by those skilled in the art, other alternatives may also be used.

Figure 5A:
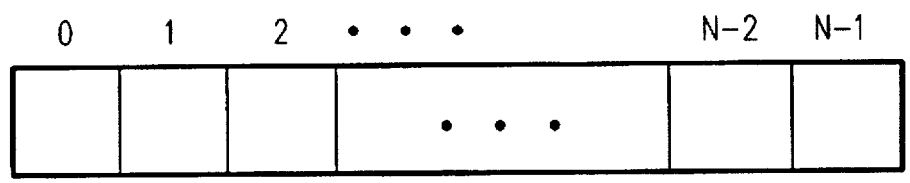
FIG. 5a is a use bit map according to the preferred embodiment of the present invention.

Referring to FIG. 5a, a use bit map for storing usage data for a logical cylinder contains one "use" bit for each of the past predetermined number N cycles. Preferably, N equals sixteen (16). The rightmost bit is the most recent, and refers to the current cycle. In other words, the use bit map provides an indicator of how many cycles of the past 16 cycles has any logical track in a logical cylinder experienced a read miss. Each logical cylinder has its own use bit map. There are other ways of providing an indicator of this activity as is well known by those skilled in the art.

Figure 5B:
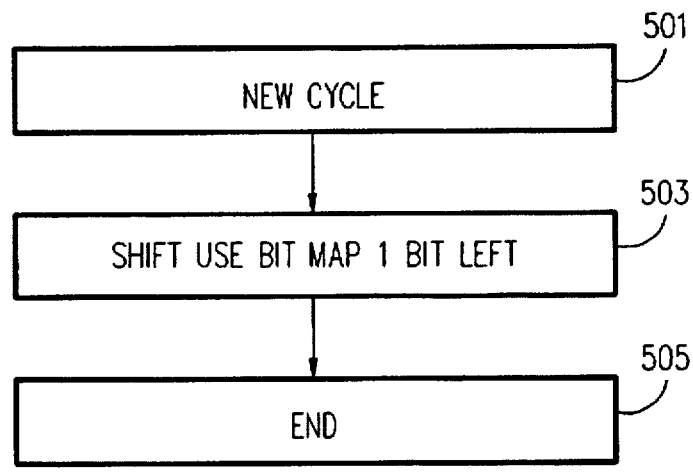
FIG. 5b is a flowchart of the updating of the use bit map during a cycle according to the preferred embodiment of the present invention.

Referring to FIG. 5b, a flowchart of the process of updating the usage data of each logical cylinder during a cycle according to the preferred embodiment of the present invention is shown. Step 501 is entered at each new clock cycle and advances to step 503. In step 503, during the clock cycle, the use bit map for all logical cylinders is shifted one (1) bit to the left. The shift is a destructive shift, in which the bit shifted out of the use bit map to the left is lost, while a zero is brought in at the right. In step 505, the process waits for the next cycle.

Figure 5C:
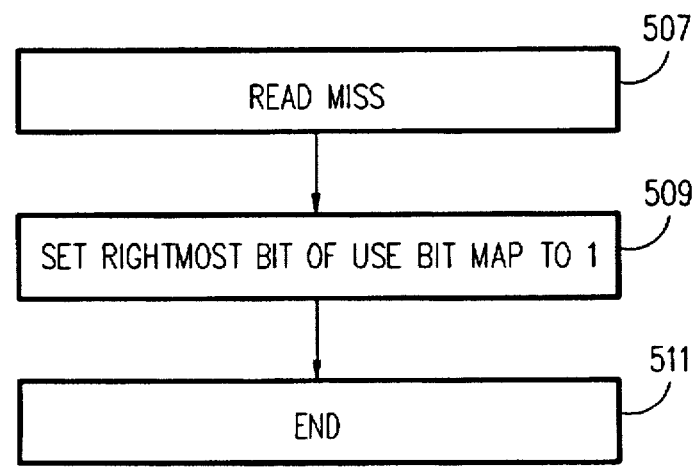
FIG. 5c is a flowchart of the updating of the use bit map when a read miss occurs according to the preferred embodiment of the present invention.

In FIG. 5c, a flowchart for updating the use bit map for a read miss according to the preferred embodiment of the present invention is shown. A "read miss" occurs when the requested logical track is not in the cache and must be read from the disk. In step 507, a read miss is detected. In step 509, the rightmost use bit of the use bit map for the logical cylinder which incurred a read miss is set to "1." In step 511, the process waits for the next read miss. The usage bit map may not need to be updated at each read miss. Once one logical track in a logical cylinder has incurred a read miss during a given cycle, the usage data for the logical cylinder does not need to be updated again during that cycle.

In the preferred embodiment of the present invention, a given logical cylinder's data are persistent if its use map contains an active cycle threshold number P or more "1" bits. Preferably, P is four (4). That is, a logical cylinder is considered persistent if there have been four (4) or more cycles with at least one read miss, for at lease one logical track of the given logical cylinder, within the past 16 cycles. At a maximum, the persistence or non-persistence of a given logical cylinder as measured by the use bit map changes once per cycle and is expected to change much less often. Persistent logical tracks are written to segments in the active region. Non-persistent logical tracks are written to segments in the inactive region.

In the preferred embodiment of the present invention, the size of the active region varies to accommodate the amount of persistent data. In other words, the threshold number P is a fixed criterion and the size of the active region is varied. In an alternative embodiment, the size of the active region is fixed, while the criterion P is subject to dynamic adjustment. In that way, the fraction of data assigned to the active region remains in agreement with the fraction of overall storage capacity of the active region. In another alternative embodiment, both P and the size of the active region can be varied. For example, P is fixed as long as the size of the active region falls within a range, but P is adjusted to avoid variations outside the range.

Segment Data

The storage system places segments containing the desired fraction P of persistent logical tracks in the active region, and the other segments are placed in the inactive region. When filling segments to be written with logical tracks received from the host, the persistence of each logical track is determined. Persistent logical tracks are written into separate memory segment buffers from those of other logical tracks. The memory segment buffers containing persistent data are written to the active region, while the remaining buffers are written to the inactive region. Similarly, during garbage collection, the persistence of each logical track is determined; and, persistent data are arranged into separate memory segment buffers from non-persistent data.

When updating a logical track, the usage data for the logical track (that is, the logical cylinder to which the track belongs) is checked to determine if the logical track is persistent (using the process described). For a new logical track where there is no previous data, the logical track is assumed to be non-persistent. As mentioned previously, the persistent logical track is written to the active region and the other logical tracks are written to the other region.

In addition to keeping usage data for each logical cylinder, indicators are maintained for each segment as to the fraction of segment storage occupied by logical tracks having persistent data. The indicators are updated in two instances. First, the indicators are updated when logical tracks belonging to the segment are updated by a host write operation (to reflect the usage data of the new logical tracks). Second, the indicators are updated when a change to the usage data for a logical track, belonging to the segment, causes the segment to change from persistent to non-persistent, or from non-persistent to persistent (calculations are described below). The usage data for a logical cylinder changes when there is a new cycle or an access is made to one of the logical tracks of the logical cylinder for the first time during that cycle.

Two ordered lists of segments, ordered by the fraction of persistent data in the segment, are maintained. One list is for the segments in the active region, the other list is for segments in the inactive region. The lists are used to identify segments in the active region with too little persistent data (hereinafter referred to as the active region list), and segments in the inactive region containing too much persistent data (hereinafter referred to as the inactive region list). In the preferred embodiment of the present invention, only approximate ordering is required. Therefore, an efficient method for maintaining a given list would be to assign each segment to a specific sublist, depending on the fraction of persistent data rounded to the nearest multiple. For example, the fraction of persistent data can be rounded to the nearest multiple of 2%. No ordering is done within each sublist.

Operational Flow

Figure 6:
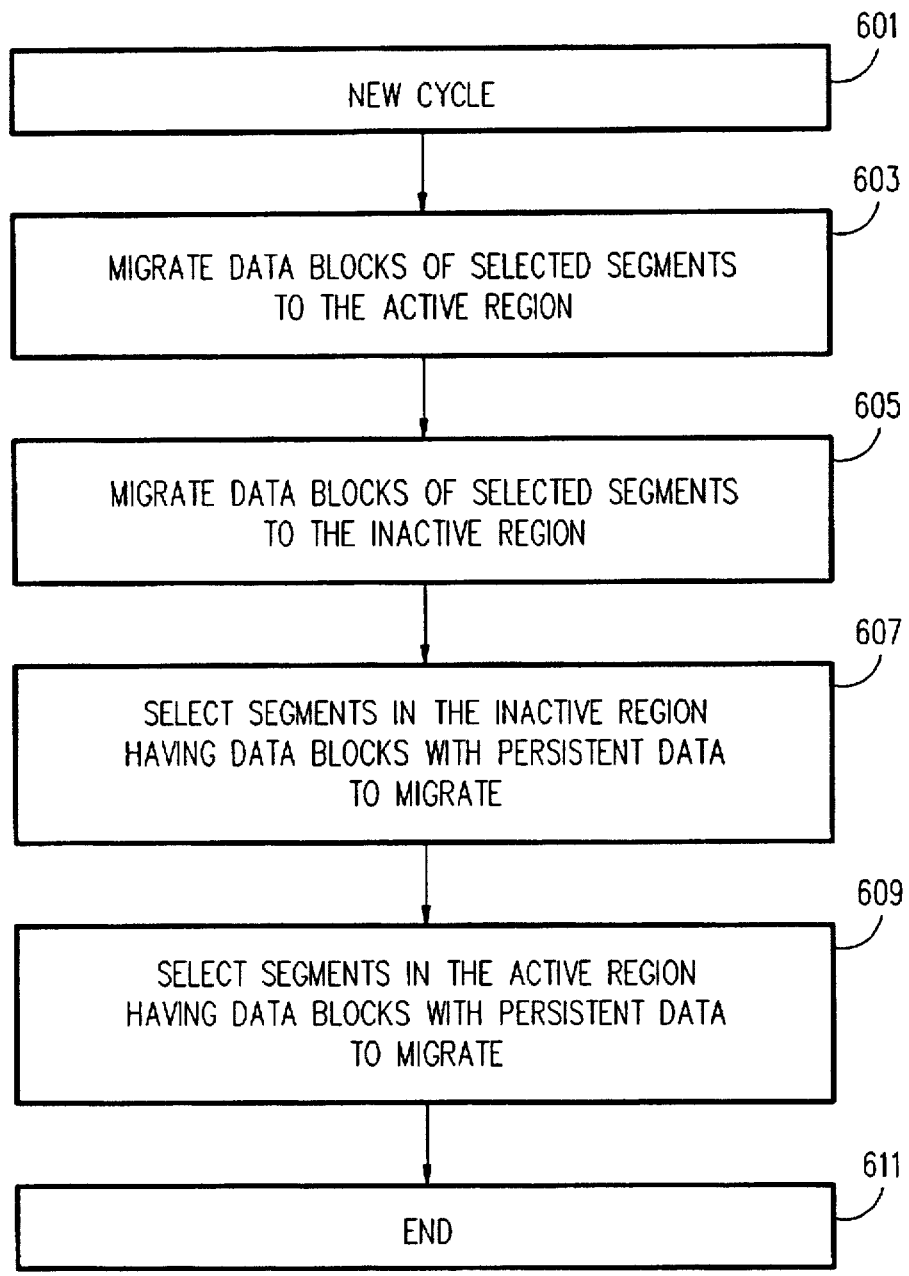
FIG. 6 is a high level flowchart of the migration of persistent and non-persistent data according to the preferred embodiment of the present invention.

Referring to FIG. 6, a flowchart shows the overall operation of the selection and migration process of the preferred embodiment. The controller detects a new clock cycle 601 and then migrates the persistent data blocks of the selected segments from the preceding cycle to the active region 603. The controller also migrates the non-persistent data blocks of the selected segments from the preceding cycle to the inactive region 605. The controller, in step 607, selects segments from the inactive region list having blocks with persistent data to migrate and, in step 609, selects segments from the active region list having data blocks with non-persistent data to migrate. The process ends 611 until the next new clock cycle.

The selection and migration process of the preferred embodiment of the present invention will be described with reference to FIG. 7. In step 701, a new clock cycle is detected. In step 703, during the clock cycle, segments selected during the preceding cycle are migrated. In step 705, the controller ascertains the fraction of persistent data blocks for each segment from the logical cylinder use map. For segments in the inactive region, the persistence fraction for a segment $p_{cs}$ is substantially equal to the number of persistent data blocks divided by the total number of data blocks for the segment. In step 707, the controller creates the ordered lists of segments: the active region list and the inactive region list as described above. In step 709, the controller determines the number $n_c$ of selected segments in the inactive region list which have a fraction of data blocks having persistent data exceeding a predetermined persistence threshold value H. The controller also determines the average fraction of persistent data $p_c$ for the $n_c$ segments. The formula for calculating $p_c$ is $$p_c = [\Sigma p_{cs}(\text{for each selected segment})] \div n_c.$$

In step 711, if no segment in the inactive region has a persistence fraction exceeding $H(n_c=0)$, then the process ends. If at least one segment in the inactive region has a persistence fraction exceeding $H(n_c>0)$, then the controller advances to step 713 to select segments having a fraction of non-persistent data in the active region from the active region list.

In step 713, the controller sets $n_h=0$, $p_h=0$, and calculates the product of $n_c$ and $p_c$, ($n_c \cdot p_c$). The variable $n_h$ is used to count the number of segments selected from the active region. $P_h$ is the average fraction of persistent data for the selected segments. For segments in the active region, the persistence fraction for a segment $p_{hs}$ is substantially equal to the number of data blocks having non-persistent data divided by the total number of data blocks for the segment. In step 715, the controller selects a segment from the active region list which has not already been selected and which contains the smallest fraction of persistent data. The controller then increments $n_h$ and calculates $p_h$. The variable $p_h$ is the average fraction of persistent data for the selected segments. The formula for calculating $p_h$ is:

$$p_h = [\Sigma p_{hs}(\text{for each selected segment})] \div n_h.$$

In step 717, the controller calculates $n_h \cdot (1-p_h)$. In step 719, the controller compares $n_h \cdot (1-p_h)$ to $(n_c \cdot p_c)$. If $n_h \cdot (1-p_h) < (n_c \cdot p_c)$, then the controller returns to step 715 to select another segment. If $n_h \cdot (1-p_h) \geq (n_c \cdot p_c)$, then the controller has selected enough segments in the active region for migration and the process ends 721 until the next clock cycle.

In summary, the method of the present invention selects a number of segments $n_h$ from the active region to satisfy the following equation as closely as possible:

$$n_h \cdot (1-p_h) = (n_c \cdot p_c). \tag{1}$$

In the preferred embodiment, the implementation of the equation results in the following inequality:

$$n_h \cdot (1-p_h) \geq (n_c \cdot p_c). \quad (2)$$

Examples of Selection Process

Figure 8A:
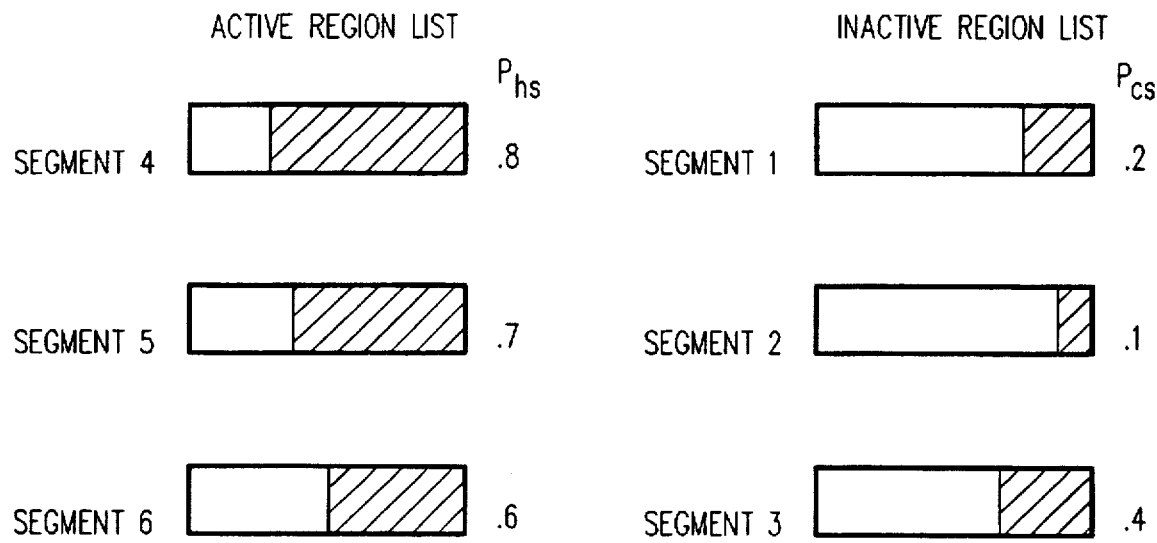
FIGS. 8a and 8b are examples of segments containing persistent and non-persistent data blocks.
Figure 8B:
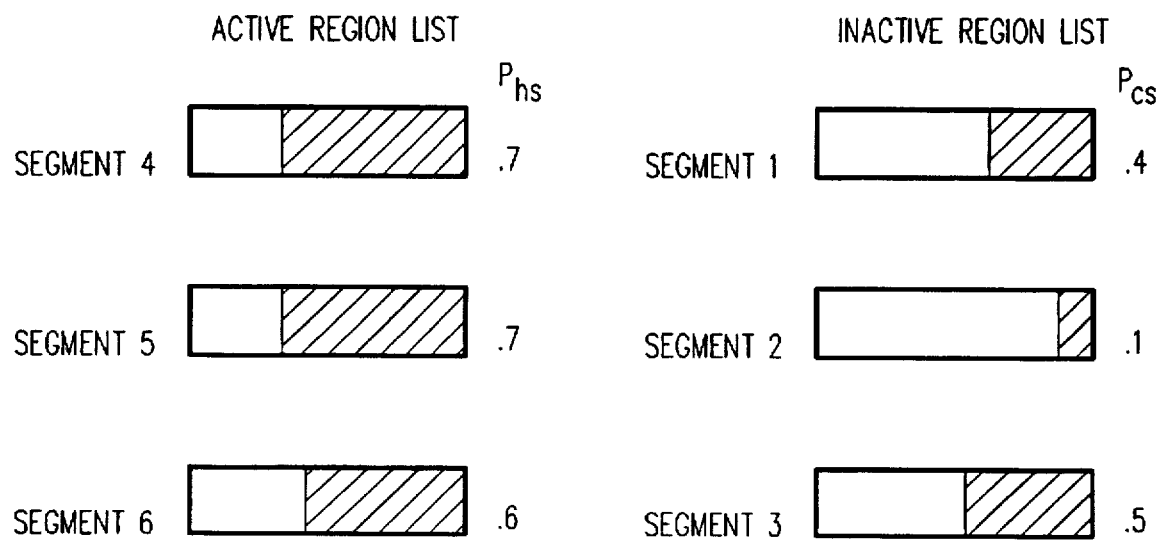

Referring to FIGS. 8a and 8b, the active region list depicts three segments of the active region having the smallest fraction of persistent data. The inactive region list depicts three segments of the inactive list having the largest fraction of persistent data. In the examples, the ordering of the segments is not shown. The shaded area illustrates a fraction of blocks of the segment which contain persistent data. In the examples, the threshold H for the inactive region list is 0.3.

Figure 7:
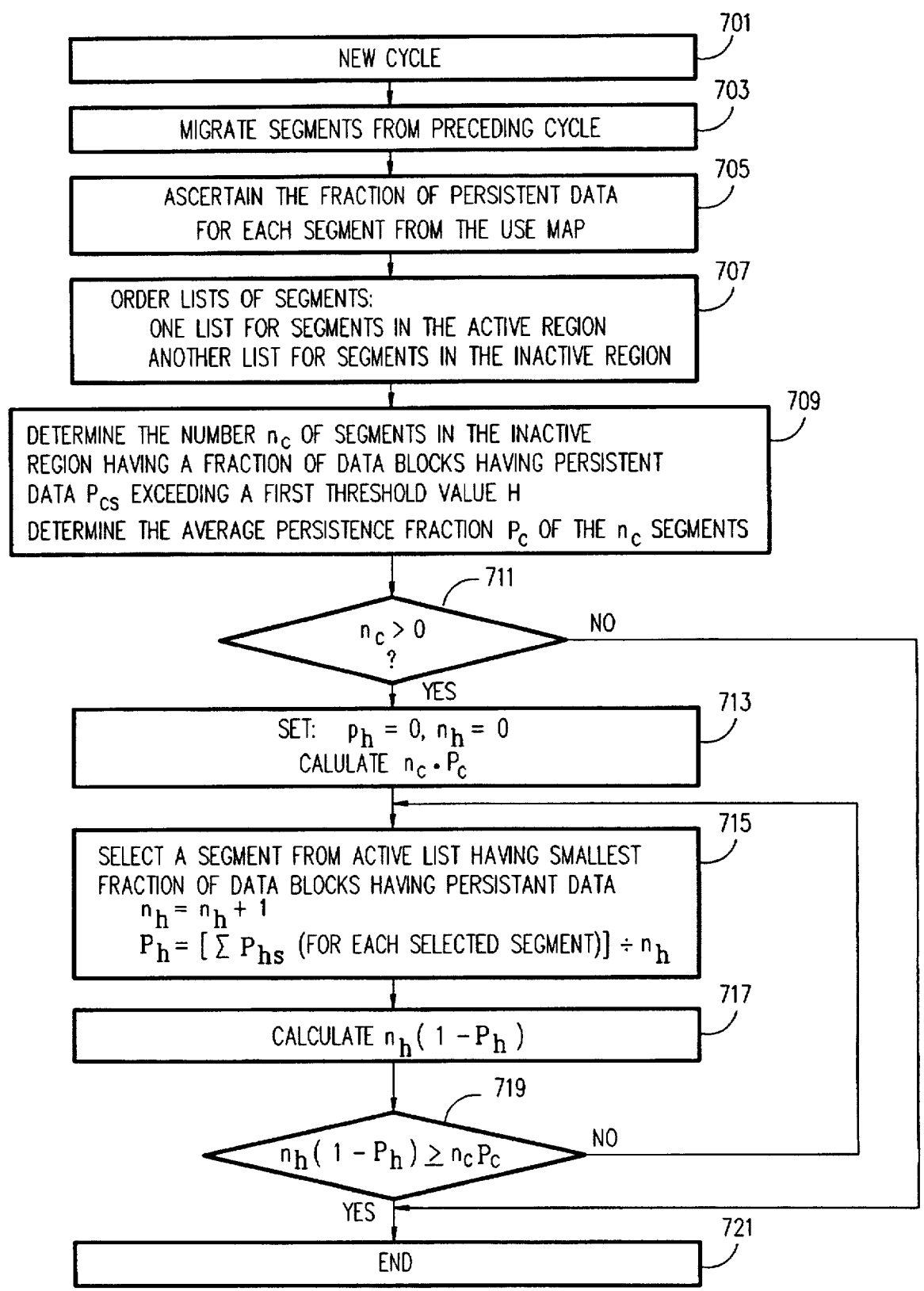
FIG. 7 is a detailed flowchart of the process shown in FIG. 6 of the selection and migration of data according to the preferred embodiment of the present invention.

Referring now to both FIGS. 7 and 8a, segment 3 of the inactive region list has $p_{cs}=0.4$. Therefore, in step 709, only segment 3 exceeds H. Since one segment in the inactive region was selected $n_c=1$, and step 711 advances to step 713. In step 713, $n_c=1$, $p_c=0.4$, and $n_c \cdot p_c=0.4$.

In step 715, segment 6 from the active region list is selected because segment 6 has the smallest fraction of persistent data $p_{hs}$ which is equal to 0.6. At this point, $n_h=1$ and $p_h=0.6$. In step 717, $n_h \cdot (1-p_h)=0.4$. In step 719, since $n_h \cdot (1-p_h)=n_c \cdot p_c$ because 0.4 equals 0.4, the segment selection process ends 721.

To summarize, segment 3 has been selected from the inactive region and segment 6 has been selected from the active region. During the next clock cycle, the data blocks from segment 3 having persistent data will be migrated to segment 6. In addition, the data blocks from segment 6 having non-persistent data will be migrated to segment 3.

Referring now to both FIGS. 7 and 8b, another example of the selection method of the preferred embodiment of the present invention is shown. In this example, in step 709, segments 1 and 3 of the inactive region list exceed H. Since two segments in the inactive region were selected, step 711 advances to step 713. In step 713, $n_c=2$, $p_c=0.45$, and $n_c \cdot p_c=0.9$.

In step 715, segment 6 from the active region list is selected because segment 6 has the smallest fraction of persistent data $p_{hs}$ which is equal to 0.6. At this point, $n_h=1$ and $p_h=0.6$. In step 717, $n_h \cdot (1-p_h)=0.4$. In step 719, since $n_h \cdot (1-p_h) < (n_c \cdot p_c)$ because 0.4 <0.9, the segment selection process repeats.

In step 715, segment 5 is selected from the active region list because segment 5 contains the next smallest fraction of persistent data $p_{hs}$ which is equal to 0.7. At this point, $n_h=2$ and $p_h=0.65$. In step 717, $n_h \cdot (1-p_h)=0.7$. In step 619, since $n_h \cdot (1-p_h)<(n_c \cdot p_c)$ (0.7 <0.9), the segment selection process repeats.

In step 715, segment 4 is selected from the active region list because segment 4 contains the next smallest fraction of persistent data $p_{hs}$ which is equal to 0.7. At this point, $n_h=3$ and $p_h=0.667$. In step 717, $n_h \cdot (1-p_h)=0.999$. In step 719, since $n_h \cdot (1-p_h)>(n_c \cdot p_c)$ because 0.999 >0.9, the segment selection process ends 721.

To summarize, segments 1 and 3 have been selected from the inactive region and segments 4, 5, and 6 have been selected from the active region. During the next clock cycle, the data blocks from segment 1 and 3 having persistent data will be migrated to segments 4, 5, and 6. In addition, the data blocks from segment 4, 5, and 6 having non-persistent data will be migrated to segments 2 and 3. When the amount of data being migrated is not equal, then accommodations are made, such as not migrating a designated data block.

Migrating Data between Active and Inactive Regions

In the preferred embodiment of the present invention, persistent data blocks are placed in the active region when the host writes data to the storage system, during garbage collection, and also when migrating during clock cycles. In alternative embodiments, persistent data blocks are placed in the active region in only one of or any combination of the following: when the host writes data to the storage system, during garbage collection, and when migrating during clock cycles.

Referring to FIG. 7, in the preferred embodiment of the present invention, during succeeding clock cycles, the previously selected $n_c$ segments from the inactive region and $n_h$ segments from the active region, are read from the disk according to their fraction of persistent data. Based on its persistence, each data block from the selected segments is then assigned individually to selected segments stored in either the active or inactive region. Data blocks having persistent data are stored in those segments to be written to the active region. Data blocks having non-persistent data are stored in those segments to be written to the inactive region. The process to migrate the data is self-contained. No significant addition to the garbage collection process occurs because the migration process frees up approximately as much storage in each area as it uses. Even if equation (1) is not met exactly, the migration process does not create holes or the added garbage collection load that would be needed to consolidate the free space associated with such holes.

In an alternative embodiment, if controller resources are constrained, or if the method selects an excessive number of segments for migration during a given cycle, then part or all of the above migration process is deferred to the next cycle. To defer migration to the next cycle, the controller selects no more than a predetermined maximum number of segments for migration. Alternatively, under some predetermined circumstances, the controller may not migrate blocks from any of the selected segments during the next cycle or some specific cycle. Furthermore, if controller resources continue to be constrained, then the migration process may be deferred for a plurality of cycles.

Alternative Embodiment for Measurement Unit Usage Data

Figure 9A:
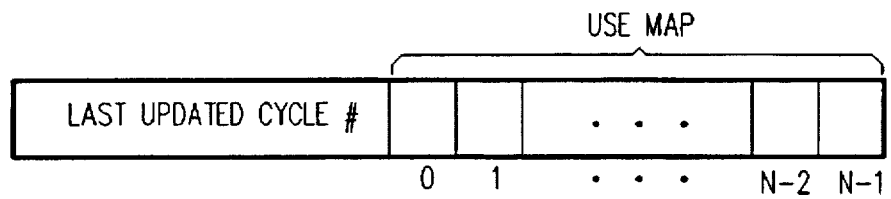
FIG. 9a is a usage data map according to an alternative embodiment of the present invention.

In an alternative embodiment, the following method for monitoring persistence is desirable for reducing the number of logical cylinder usage data updates. Although this alternative method uses additional directory storage, the method greatly reduces the number of updates to the use bit map. Unlike the previously described use bit map which does not store a cycle number, in this alternative embodiment (FIG. 9a), the usage data includes a cycle number that identifies the cycle of the most recent usage data update and a bit map having one "use" bit for each of the past N cycles since it was updated, where N equals sixteen (16). The rightmost bit is the most recent, and corresponds to the cycle number.

Figure 9B:
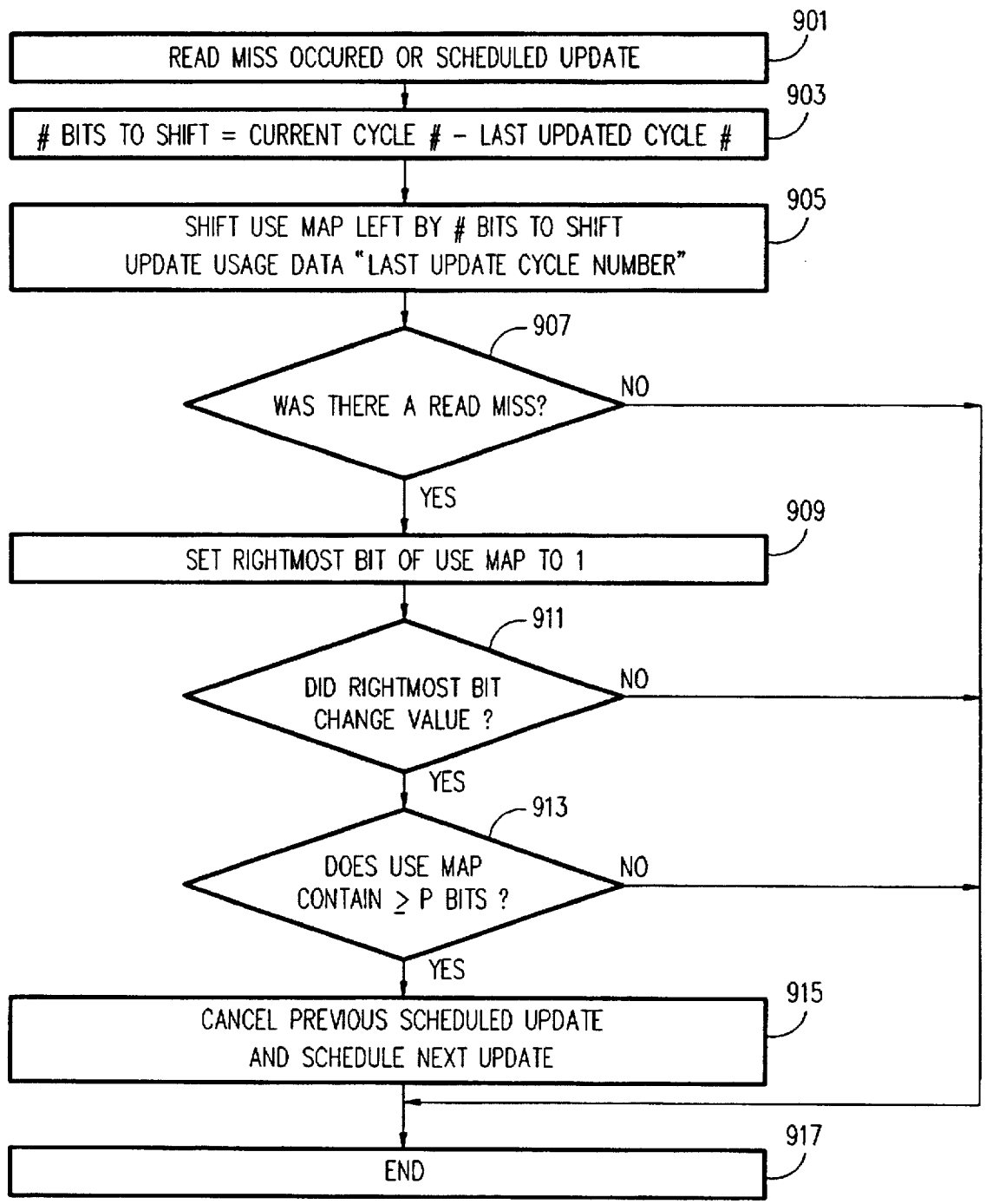
FIG. 9b is a flowchart of the updating of the usage data according to the alternative embodiment.

Referring also to FIG. 9b, a flowchart for updating the use bit map for the alternative embodiment is shown. Because the cycle number of the most recent update is stored, the storage system does not need to update the usage data during every cycle. The usage data is updated either when a read miss occurs or when scheduled as described below. In step 901 either a read miss or a scheduled update occurred. In step 903, the number of bits to shift is determined. The number of shifts S equals the difference between the current cycle count and the cycle count of the last update. In step 905, if the number of bits to shift S equals or exceeds the size of the number of bits in the use map, N, then the use map is set to zero (not shown). If the number of bits to shift S is less than the number of bits in the use map N, the use map is shifted left by S bits. The shift is destructive because the bits shifted out of the use map to the left are lost, while zeros are brought in at the right. The usage data cycle count is also updated. In step 907, the controller determines if a read miss occurred. If so, step 907 advances to step 909 in which the controller sets the rightmost bit to "1."In step 911, the controller determines if the rightmost bit changed value. If the right most bit has not changed, then step 911 advances to step 917 and the process ends. If the right most bit changed, then step 911 advances to step 913 in which the controller determines if the use map contains at least P "1"-bits. If the use map does not contain at least P "1"-bits, then step 913 advances to step 917 and the process ends. If the use map does contain at least P "1"-bits, then step 913 advances to step 915. In step 915, the controller determines the offset S of the $P^{th}$"1"-bit from the right. The value of the offset is based on labeling the use bits 0, 1, 2,. . . , N-1, starting from the left. The controller cancels any previously scheduled update for the measurement unit and reschedules an update to occur during the cycle number equal to the current cycle number plus S+1 cycles.

To track scheduled updates, N work queues are maintained, one for each of the next N cycles. At a given time, a given measurement unit appears either on exactly one of the work queues, if its use map has P or more bits, or does not appear on any of the work queues. In addition, although updates are queued for any persistent measurement unit, updates actually occur only when the measurement unit becomes non-persistent. There are other alternate methods for tracking use data as is known to those skilled in the art.

An Alternative Selection Algorithm

In the preferred embodiment of the present invention, a set of segments is first selected from segments stored in the inactive region which have a threshold fraction of data blocks having persistent data. In an alternative embodiment, a set of segments is first selected from segments stored in the active region which have a fraction of data blocks with persistent data below a predetermined threshold. After selecting the initial set of segments from the active region, then a set of segments from the inactive region is selected. As is known to those in skilled in the art, although the methods are similar, the previously described method for selecting segments (select first from the active region then from the inactive region) can be modified to select first from the inactive region, then from the active region.

CONCLUSION

The invention has been described by way of a preferred embodiment, but those skilled in the art will understand that various changes in form and detail may be made without deviating from the spirit or scope of the invention.

We claim:

1. A method for managing data in a storage system having a processor, memory, and at least one storage device, each storage device having an active region and an inactive region, wherein a plurality of data blocks are stored in each region, the method comprising the processor-executed steps of:

designating a group of data blocks as a persistent data block group when at least one data block in the data block group was accessed from the storage device at least once per cycle for an active cycle threshold number of cycles out of a predetermined number of cycles, wherein each data block in a persistent data block group is designated as a persistent data block;

at predetermined intervals, migrating at least one persistent data block, that is stored in the inactive region, to the active region; and at said predetermined intervals, migrating at least one non-persistent data block, that is stored in the active region, to the inactive region.

2. The method for managing data in a storage system as called for in claim 1 further comprising the steps of:

determining whether a data block has been designated as a persistent data block when an update of the data block is to be written to the storage device, and writing the updated data block to the active region when the data block has been designated as a persistent data block.

3. The method for managing data in a storage system as called for in claim 1 further comprising the steps of:

determining whether a data block has been designated as a persistent data block during garbage collection, and writing the data block to the active region during garbage collection when the data block has been designated as a persistent data block.

4. A method for managing data in a storage system having a processor, memory, and at least one storage device, each storage device having an active region and an inactive region, wherein a plurality of active segments of data blocks are stored in the active region and a plurality of inactive segments of data blocks are stored in the inactive region, the method comprising the steps of:

monitoring persistent read activity for the data blocks such that each data block can be designated as either a persistent data block or a non-persistent data block;

when an update of a data block is to be written to the storage devices, determining whether the data block has been designated as a persistent data block or a non-persistent data block such that the updated persistent data block is written as part of an active segment in the active region and the updated non-persistent data block is written as part of an inactive segment in the inactive region;

at a first predetermined interval, selecting an inactive set of inactive segments stored in the inactive region for data block migration, each inactive segment in said inactive set having at least one persistent data block;

at the first predetermined interval, selecting an active set of active segments stored in the active region for data block migration, each active segment in said active set having at least one non-persistent data block;

at a second predetermined interval, migrating said at least one persistent data block from the inactive set of inactive segments to the active set of active segments stored in the active region; and at the second predetermined interval, migrating said at least one non-persistent data block from the active set of active segments to the inactive set of inactive segments stored in the inactive region.

5. The method for managing data in a storage system as called for in claim 4, wherein each inactive segment in the inactive set of segments selected for data block migration has a fraction of persistent data blocks exceeding a persistence threshold, and the active segments in the active set of segments selected for data block migration are selected based on the total size of the persistent data blocks in the inactive set of segments selected for data block migration.

6. The method for managing data in a storage system as called for in claim 4 further comprising the step of:

for each segment, storing in memory, a segment persistence fraction representing the number of persistent data blocks in the segment divided by the total number of data blocks in the segment, and wherein the active and inactive sets of segments are selected by examining the segment persistence fraction for each segment.

7. The method for managing data in a storage system as called for in claim 4, wherein the storage system manages data as a log structured array, each data block is a logical track, and each data block group is a logical cylinder.

8. A computerized storage system for managing the storage of data in a log structured array, comprising:

at least one storage device having an active region and an inactive region, wherein a plurality of segments of data blocks are stored in each region;

a persistence indicator stored in memory, tracking persistent read activity over a plurality of cycles for designating each data block as a persistent data block or a non-persistent data block; and a segment persistence fraction, stored in memory, for each segment, representing the number of persistent data blocks in the segment relative the total number of data blocks in the segment, and wherein at least one non-persistent data block in an active segment, stored in the active region, having a segment persistence fraction over a first predetermined threshold, is migrated to an inactive segment, stored in the inactive region, having a segment persistence fraction over a predetermined threshold.

9. The storage system as called for in claim 8 further comprising:

a determination means for determining whether a data block is persistent or non-persistent when an updated data block is to be written to the storage device; and a writing means for writing an updated persistent data block to the active region of the disk and an updated non-persistent data block to the inactive region.

10. The storage system as called for in claim 8 further comprising:

a determination means for determining whether a data block is persistent or non-persistent during garbage collection; and a writing means for writing a persistent data block to the active region and a non-persistent data block to the inactive region during garbage collection.

11. The storage system as called for in claim 9 further comprising:

means for selecting, at predetermined intervals, an inactive set of segments stored in the inactive region having a fraction of data persistent blocks exceeding a first threshold; and means for selecting, at predetermined intervals, an active set of segments stored in the active region, wherein each segment in the active set of segments is selected based on the number of segments in the inactive set of segments and the average fraction of persistent data blocks in the inactive set of segments.

12. The storage system as called for in claim 8, wherein said persistence indicator comprises a data block group indicator for each of a plurality of data block groups indicating whether at least one read miss occurred within a cycle for each of a predetermined number of cycles for at least one of the data blocks in the data block group, wherein the data block group is determined to have persistent data if the number of cycles having at least one read miss exceeds an active cycle threshold.

13. An article of manufacture for use in storing and managing data in a computer system, the computer system having at least one storage device having an active region and an inactive region and means for writing a plurality of segments of data blocks to the storage device, said article of manufacture having a computer program code embodied in said medium which may cause the computer to:

(a) designate a group of data blocks as a persistent data block group when at least one read miss has occurred for at least one data block in the data block group for an active cycle threshold number of cycles out of a predetermined number of cycles, wherein each data block in a persistent data block group is designated as a persistent data block;

(b) at predetermined intervals, migrate at least one persistent data block, that is stored in the inactive region, to the active region; and (c) at said predetermined intervals, migrate at least one non-persistent data block, that is stored in the active region, to the inactive region.

14. The article of manufacture as claimed in claim 13, wherein the program code may cause the computer to:

determine whether a data block has been designated as a persistent data block when an update of the data block is to be written to the storage device, and write the updated data block to the active region when the data block has been designated as a persistent data block.

15. The article of manufacture as claimed in claim 13, wherein the program code may cause the computer to:

determine whether a data block has been designated as a persistent data block during garbage collection, and write the data block to the active region during garbage collection when the data block has been designated as a persistent data block.

16. The article of manufacture as claimed in claim 13, wherein the program code may cause the computer to:

at said predetermined intervals, select an inactive set of inactive segments stored in the inactive region for data block migration, each segment in said inactive set having at least one persistent data block; and at said predetermined intervals, select an active set of active segments stored in the active region for data block migration, each segment in said active set having at least one non-persistent data block, wherein said at least one persistent data block that is migrated is in said inactive set of segments and said at least one non-persistent data block that is migrated is in said active set of segments.

17. The article of manufacture as claimed in claim 16, wherein each inactive segment in the inactive set of segments selected for data block migration has a fraction of persistent data blocks exceeding a persistence threshold, and the active segments in the active set of segments selected for data block migration are selected based on the total size of the persistent data blocks in the inactive set of segments selected for data block migration.

18. The article of manufacture as claimed in claim 13, wherein the program code may further cause the computer to:

for each segment, stored in memory, a segment persistence fraction representing the number of persistent data blocks in the segment divided by the total number of data blocks in the segment, and wherein the active and inactive sets of segments are selected by examining the segment persistence fraction for each segment.

\* \* \* \* \*